US012607850B2

(12) United States Patent 
Seder et al.

(10) Patent No.: US 12,607,850 B2 
(45) Date of Patent: Apr. 21, 2026

(54) HUD FIELD OF VIEW EXPANSION

(71) Applicant: GM Global Technology Operations LLC, Detroit, MI (US)

(72) Inventors: Thomas A. Seder, Fraser, MI (US); Joseph F. Szczerba, Grand Blanc, MI (US); John P. Weiss, Shelby Township, MI (US); Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 626 days.

(21) Appl. No.: 18/306,451

(22) Filed: Apr. 25, 2023

(65) Prior Publication Data

US 2024/0361596 A1 Oct. 31, 2024

(51) Int. Cl.
| | |
|---|---|
| *G02B 27/01* | (2006.01) |
| *A63F 13/53* | (2014.01) |
| *G02B 27/00* | (2006.01) |
| *G06T 11/60* | (2026.01) |
| *G09G 3/00* | (2006.01) |

(52) U.S. Cl.
CPC ......... *G02B 27/0103* (2013.01); *G09G 3/001* (2013.01); *G02B 2027/0123* (2013.01); *G09G 2320/0626* (2013.01); *G09G 2340/0464* (2013.01); *G09G 2340/10* (2013.01); *G09G 2340/12* (2013.01); *G09G 2380/10* (2013.01)

(58) Field of Classification Search
CPC ......... B60R 1/00; A61B 69/001; A61B 3/113; A61B 3/1225; A61B 3/103; G01S 11/12; G01S 1/02; G02B 27/144; G02B 27/0172; G02B 27/145; G02B 27/013; G02B 27/0149; G02B 27/0103; G02B 27/0101; G02B 27/017; G02B 27/01; G09G 3/003; H04N 7/18; G06T 19/00; G06T 19/006; G05D 1/0038; G05D 1/0246
USPC ............. 359/629–636, 13–14, 618; 345/7–9, 345/632–633, 207; 348/113–120; 351/210, 221, 200
See application file for complete search history.

(56) References Cited

U.S. PATENT DOCUMENTS

| | | | |
|---|---|---|---|
| 2021/0070176 A1* | 3/2021 | Rao | G09G 3/36 |
| 2022/0236559 A1* | 7/2022 | Chen | G02B 5/10 |

FOREIGN PATENT DOCUMENTS

| | | | | |
|---|---|---|---|---|
| CN | 113031264 B | * | 8/2022 | G02B 27/283 |

* cited by examiner

*Primary Examiner* — Dawayne Pinkney 
(74) *Attorney, Agent, or Firm* — Vivacqua Crane, PLLC

(57) ABSTRACT

A head up display for a vehicle includes a holographic projector adapted to project a holographic image, a controller adapted to split a holographic image into a first half image and a second half image and calculate phase holograms for each, a phase light modulator adapted to sequentially and alternately receive and encode the first half image and the second half image, a digital light processor adapted to sequentially and alternately receive the first half image and second half image, sequentially direct the first half image to a first position on a windshield, and direct the second half image to a second position on the windshield, adjacent to the first position.

20 Claims, 6 Drawing Sheets

HUD FIELD OF VIEW EXPANSION

INTRODUCTION

The present disclosure relates to a head up display (HUD) system within a vehicle and a method of increasing the size of a field of view of the HUD system. Current solid-state phase light modulators (PLMs) are desirable because they are temperature insensitive and are exceptionally fast. However, current solid-state phase light modulators are limited to about five degrees of field of view (FOV).

Thus, while current systems and methods achieve their intended purpose, there is a need for a new and improved system and method of providing an expanded field of view in a HUD system.

SUMMARY

According to several aspects of the present disclosure, a head up display for a vehicle includes a holographic projector adapted to project a holographic image, a controller adapted to split a holographic image into a first half image and a second half image and calculate phase holograms for each of the first half image and the second half image, a phase light modulator (PLM) having a defined field of view (FOV) and adapted to sequentially and alternately receive and encode the first half image and the second half image, a digital light processor (DLP) adapted to sequentially and alternately receive the first half image and second half image from the PLM, sequentially direct the first half image to a first position on an inner surface of a windshield of the vehicle, and direct the second half image to a second position on the inner surface of the windshield of the vehicle and adjacent to the first position, wherein, the first half image displayed at the first position and the second half image displayed at the second position result in a re-creation of the holographic image, displayed on the inner surface of the windshield, and having a FOV that is twice the size of the FOV of the PLM.

According to another aspect, the DLP is adapted to sequentially direct the first half image to the first position on the inner surface of the windshield of the vehicle for less than 33 μs, and direct the second half image to the second position on the inner surface of the windshield of the vehicle for less than 33 μs.

According to another aspect, the holographic projector includes a red laser, a green laser and a blue laser, and when the controller calculates phase holograms for each of the first half image and the second half image, the controller is further adapted to calculate a red phase hologram, a green phase hologram and a blue phase hologram for the first half image, and to calculate a red phase hologram, a green phase hologram and a blue phase hologram for the second half image.

According to another aspect, the PLM is further adapted to sequentially receive and encode the red phase hologram, the green phase hologram and the blue phase hologram for the first half image, and the red phase hologram, the green phase hologram and the blue phase hologram for the second half image.

According to another aspect, the DLP is further adapted to sequentially receive the red phase hologram, the green phase hologram and the blue phase hologram for the first half image and the red phase hologram, the green phase hologram and the blue phase hologram for the second half image from the PLM, sequentially direct the red phase hologram, the green phase hologram and the blue phase hologram for the first half image to the first position on the inner surface of the windshield of the vehicle, and sequentially direct the red phase hologram, the green phase hologram and the blue phase hologram for the second half image to the second position on the inner surface of the windshield of the vehicle and adjacent to the first position.

According to another aspect, the DLP is further adapted to sequentially direct the red phase hologram for the first half image to the first position on the inner surface of the windshield of the vehicle for less than 10 μs, direct the green phase hologram for the first half image to the first position on the inner surface of the windshield of the vehicle for less than 10 μs, direct the blue phase hologram for the first half image to the first position on the inner surface of the windshield of the vehicle for less than 10 μs, direct the red phase hologram for the second half image to the second position on the inner surface of the windshield of the vehicle for less than 10 μs, direct the green phase hologram for the second half image to the second position on the inner surface of the windshield of the vehicle for less than 10 μs, and direct the blue phase hologram for the second half image to the second position on the inner surface of the windshield of the vehicle for less than 10 μs.

According to another aspect, the power level of each of the red, green and blue lasers is increased to compensate for luminance decrease due to sequential switching between the first half image and the second half image.

According to another aspect, the DLP is adapted to use a compensation algorithm to precisely match an FOV of the red phase hologram, the green phase hologram and the blue phase hologram for each of the first half image and the second half image, due to varying wavelength of the red, green and blue lasers.

According to another aspect, the DLP includes a photo sensor with active feedback and is adapted to maintain color alignment and image edge alignment between the first half image and the second half image.

According to another aspect, the DLP is adapted to blend adjacent edges of the first half image and the second half image to allow overlapping of the adjacent edges of the first half image and the second half image.

According to several aspects of the present disclosure, a method of enlarging the field of view of a head up display for a vehicle includes splitting, with a controller a holographic image into a first half image and a second half image, calculating, with the controller, phase holograms for each of the first half image and the second half image, sequentially and alternately, with a phase light modulator (PLM) having a defined field of view (FOV), receiving, from a holographic projector adapted to project a holographic image, the first half image and the second half image, and, encoding the first half image and the second half image, sequentially and alternately, with a digital light processor (DLP), receiving the first half image and second half image from the PLM, sequentially, with the DLP, directing the first half image to a first position on an inner surface of a windshield of the vehicle, and directing the second half image to a second position on the inner surface of the windshield of the vehicle and adjacent to the first position, wherein, the first half image displayed at the first position and the second half image displayed at the second position result in a re-creation of the holographic image, displayed on the inner surface of the windshield, and having a FOV that is twice the size of the FOV of the PLM.

According to another aspect, the sequentially, with the DLP, directing the first half image to a first position on an inner surface of a windshield of the vehicle, and directing the second half image to a second position on the inner surface of the windshield of the vehicle and adjacent to the first position further includes directing the first half image to the first position on the inner surface of the windshield of the vehicle for less than 33 μs, and directing the second half image to a second position on the inner surface of the windshield of the vehicle for less than 33 μs.

According to another aspect, the holographic projector includes a red laser, a green laser and a blue laser, and the calculating, with the controller, phase holograms for each of the first half image and the second half image further includes calculating a red phase hologram, a green phase hologram and a blue phase hologram for the first half image, and calculating a red phase hologram, a green phase hologram and a blue phase hologram for the second half image.

According to another aspect, the sequentially and alternately, with a phase light modulator (PLM) having a defined field of view (FOV), receiving, from the holographic projector adapted to project the holographic image, the first half image and the second half image, and, encoding the first half image and the second half image further includes sequentially receiving and encoding, with the PLM, the red phase hologram, the green phase hologram and the blue phase hologram for the first half image, and receiving and encoding, with the PLM, the red phase hologram, the green phase hologram and the blue phase hologram for the second half image.

According to another aspect, the sequentially and alternately, with a digital light processor (DLP), receiving the first half image and second half image from the PLM further includes sequentially receiving, with the DLP, the red phase hologram, the green phase hologram and the blue phase hologram for the first half image and the red phase hologram, the green phase hologram and the blue phase hologram for the second half image from the PLM, the sequentially, with the DLP, directing the first half image to the first position on an inner surface of a windshield of the vehicle further includes sequentially directing, with the DLP, the red phase hologram, the green phase hologram and the blue phase hologram for the first half image to the first position on the inner surface of the windshield of the vehicle, and the sequentially, with the DLP, directing the second half image to the second position on the inner surface of the windshield of the vehicle further includes sequentially directing, with the DLP, the red phase hologram, the green phase hologram and the blue phase hologram for the second half image to the second position on the inner surface of the windshield of the vehicle and adjacent to the first position.

According to another aspect, the sequentially directing, with the DLP, the red phase hologram, the green phase hologram and the blue phase hologram for the first half image to the first position on the inner surface of the windshield of the vehicle further includes directing the red phase hologram for the first half image to the first position on the inner surface of the windshield of the vehicle for less than 10 μs, directing the green phase hologram for the first half image to the first position on the inner surface of the windshield of the vehicle for less than 10 μs, and directing the blue phase hologram for the first half image to the first position on the inner surface of the windshield of the vehicle for less than 10 μs, and the sequentially directing, with the DLP, the red phase hologram, the green phase hologram and the blue phase hologram for the second half image to the second position on the inner surface of the windshield of the vehicle further includes directing the red phase hologram for the second half image to the second position on the inner surface of the windshield of the vehicle for less than 10 μs, directing the green phase hologram for the second half image to the second position on the inner surface of the windshield of the vehicle for less than 10 μs, and directing the blue phase hologram for the second half image to the second position on the inner surface of the windshield of the vehicle for less than 10 μs.

According to another aspect, the method further includes increasing the power level of each of the red, green and blue lasers to compensate for luminance decrease due to sequential switching between the first half image and the second half image.

According to another aspect, the method further includes using, with the DLP, a compensation algorithm to precisely match an FOV of the red phase hologram, the green phase hologram and the blue phase hologram for each of the first half image and the second half image, due to varying wavelength of the red, green and blue lasers.

According to another aspect, the DLP includes a photo sensor with active feedback, the method further including maintaining, with the DLP, using feedback from the photo sensor, color alignment and image edge alignment between the first half image and the second half image, and blending adjacent edges of the first half image and the second half image, with the DLP, to allow overlapping of adjacent edges of the first half image and the second half image.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
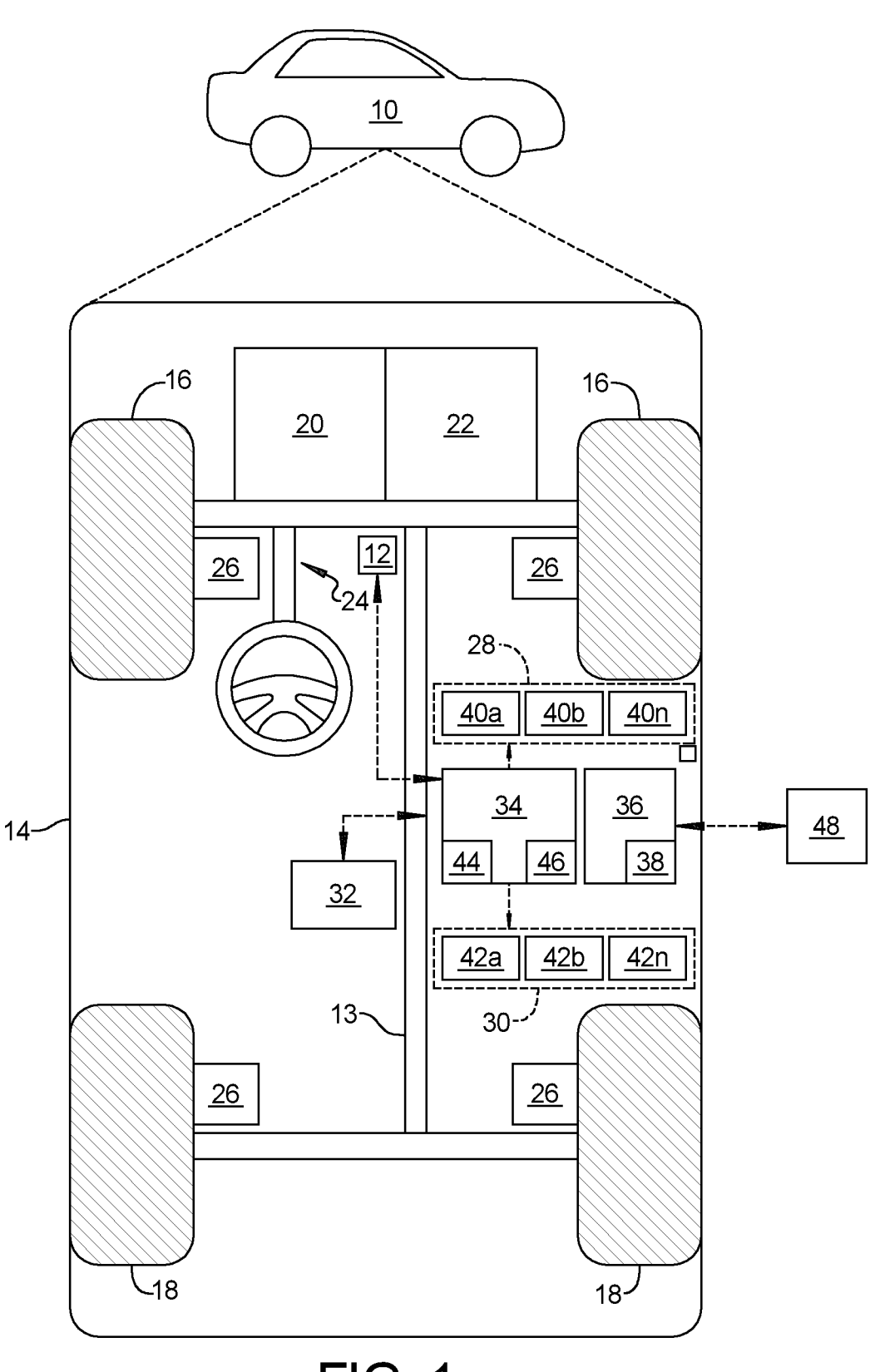
FIG. 1 is a schematic view of a vehicle equipped with a head up display system according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated head up display (HUD) system 12 in accordance with various embodiments. The vehicle 10 generally includes a chassis 13, a body 14, front wheels 16, and rear wheels 18. The body 14 is arranged on the chassis 13 and substantially encloses components of the vehicle 10. The body 14 and the chassis 13 may jointly form a frame. The front wheels 16 and rear wheels 18 are each rotationally coupled to the chassis 13 near a respective corner of the body 14.

In various embodiments, the vehicle 10 is an autonomous vehicle and the system 12 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios.

According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensor system 28 includes at least one non-visual sensor 40A that is adapted to detect objects within an environment surrounding the vehicle 10, and at least one image capturing device 40b adapted to capture images of the environment surrounding the vehicle 10. The cameras can include two or more digital cameras spaced at a selected distance from each other, in which the two or more digital cameras are used to obtain stereoscopic images of the surrounding environment in order to obtain a three-dimensional image. The sensing devices 40a-40n can include sensors that monitor dynamic variables of the vehicle, such as its velocity, its acceleration, a number of times that the brake is applied, etc. The actuator system 30 includes one or more actuator devices 42a-42n that control one or more vehicle features such as, but not limited to, the propulsion system 20, the transmission system 22, the steering system 24, and the brake system 26.

The controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The communication system 36 is configured to wirelessly communicate information to and from other entities 48, such as but not limited to, other vehicles ("V2V" communication), infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
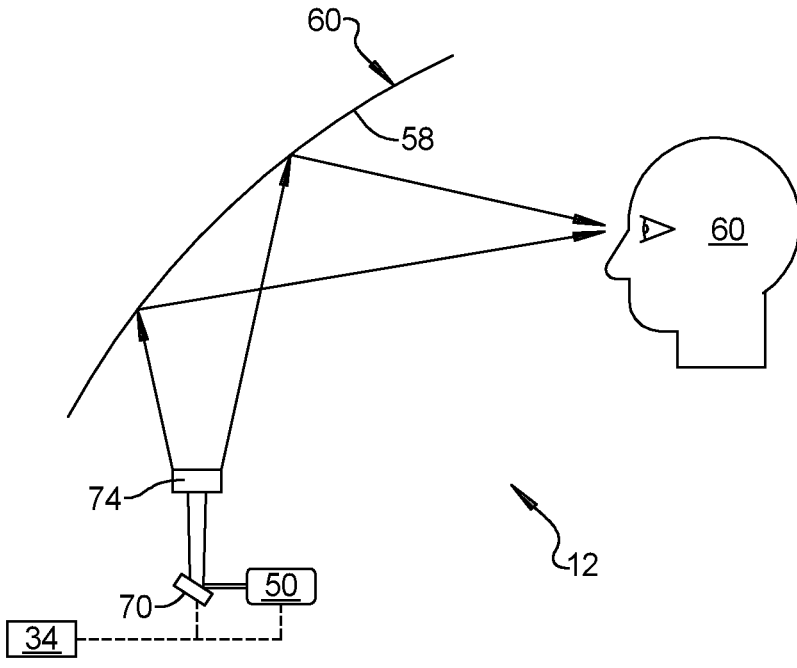
FIG. 2 is schematic view of a head up display system according to an exemplary embodiment of the present disclosure.
Figure 3:
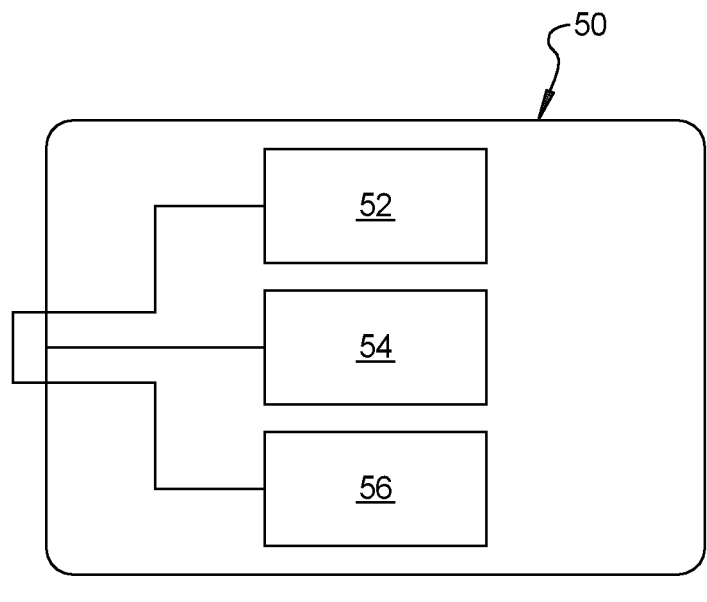
FIG. 3 is a schematic side view of a holographic projector of the head up display system shown in FIG. 2.

Referring to FIG. 2 and FIG. 3, in an exemplary embodiment, the head-up display (HUD) system 12 according to the present disclosure includes a holographic projector 50 that includes a red laser 52, a green laser 54 and a blue laser 56 and is adapted to project a holographic image upward to an inner surface 58 of a windshield 60 of the vehicle 10 to be seen by an occupant 62 of the vehicle 10. The controller 34 is in communication with the holographic projector 50 and is adapted to split a holographic image 64 into a first half image 66 and a second half image 68 and to calculate phase holograms for each of the first half image 66 and the second half image 68.

Figure 4:
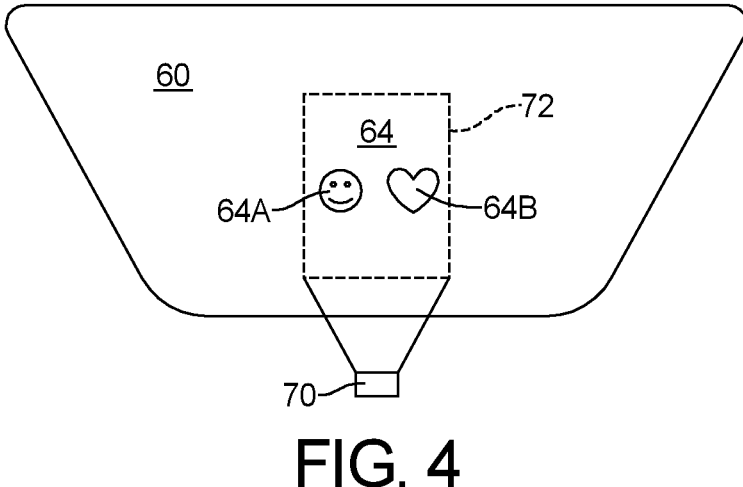
FIG. 4 is a schematic view of a windshield of a vehicle wherein a holographic image is being displayed by a phase light modulator.

A phase light modulator (PLM) 70 has a defined field of view (FOV) 72 and is adapted to sequentially and alternately receive and encode the first half image 66 and the second half image 68. Referring to FIG. 4, a schematic of a windshield 60 is shown, wherein a holographic image 64 is displayed by a PLM 70. As mentioned above, the PLM 70 has a defined FOV 72. Due to constraints of the PLM, the size of the FOV 72 of the PLM 70 can be quite limited.

Figure 5:
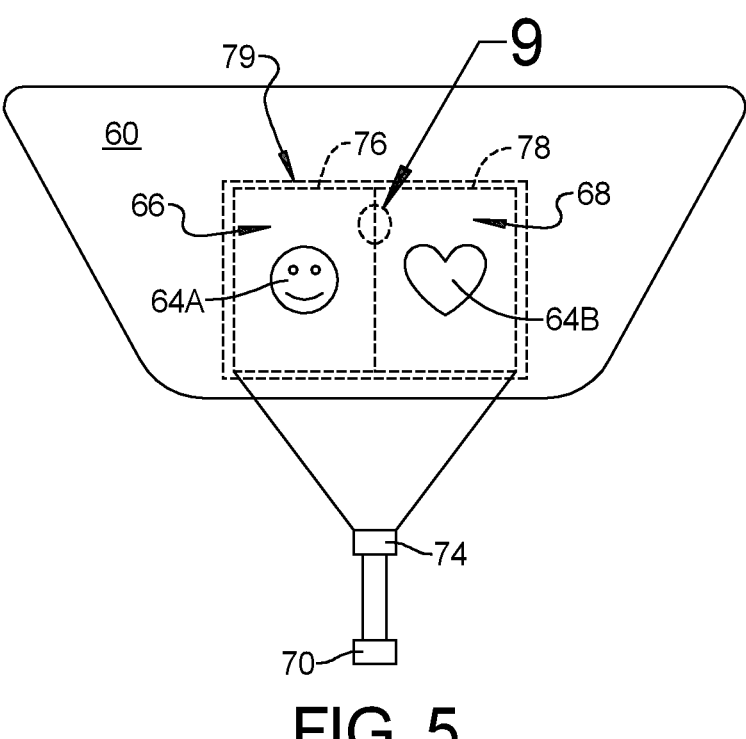
FIG. 5 is a schematic view of a windshield of a vehicle wherein a first half image and a second half image are displayed by a phase light modulator with a digital light processor placed in the optical path between the phase light modulator and the windshield.

As mentioned above, the controller 34 is adapted to split the holographic image 64 into a first half image 66 and a second half image 68. As shown in FIG. 4, a holographic image 64 includes two characters, a smiley face 64A and a heart 64B. Once the holographic images is split, the first half image 66 includes the smiley face 64A and the second half image 68 includes the heart 64B. Referring to FIG. 2 and FIG. 5, a digital light processor (DLP) 74 is positioned between the PLM 70 and the windshield 60 and is adapted to sequentially and alternately receive the first half image 66 and second half image 68 from the PLM 70, and to sequentially direct the first half image 66 to a first position 76 on the inner surface 58 of the windshield 60 of the vehicle 10, and direct the second half image 68 to a second position 78 on the inner surface 58 of the windshield 60 of the vehicle 10 and adjacent to the first position 76.

Figure 6:
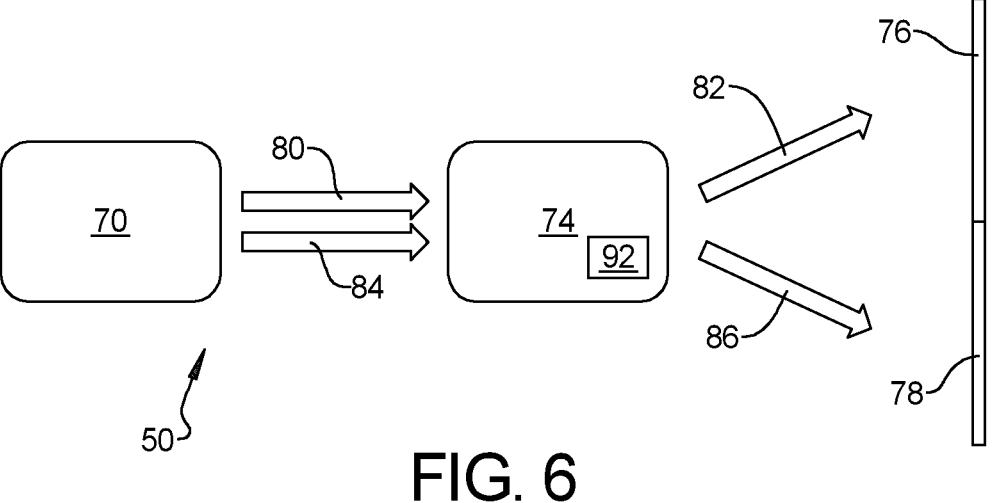
FIG. 6 is a side schematic view of the head up display system according to an exemplary embodiment of the present disclosure.
Figure 7:
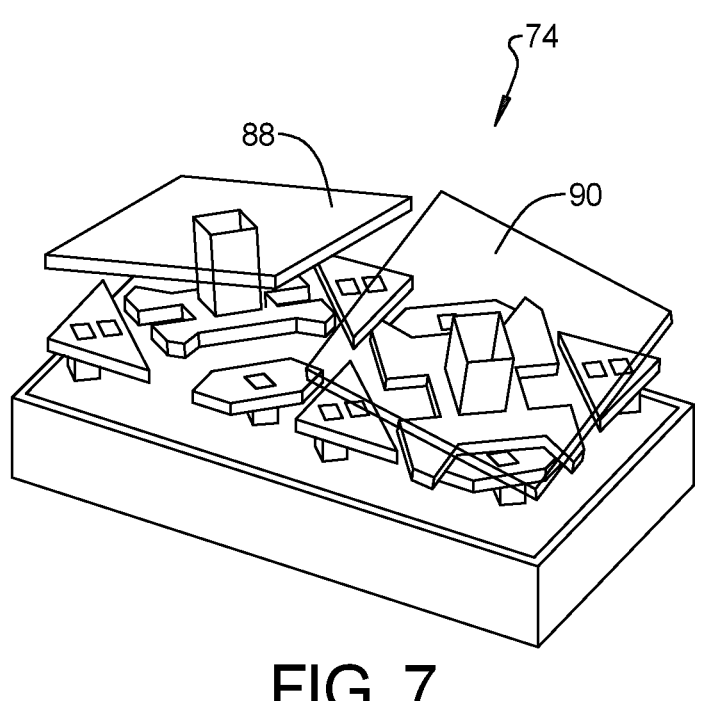
FIG. 7 is a perspective view of a digital light processor according to an exemplary embodiment of the present disclosure.

Referring to FIG. 6 and FIG. 7, a schematic view of the projector 50 illustrates how first, the PLM 70 projects the first half image 66 to the DLP 74, as indicated by arrow 80, and the DLP 74 directs the first half image 66 to the first position 76, as indicated by arrow 82. The PLM 70 projects the second half image 68 to the DLP 74, as indicated by arrow 84, and the DLP 74 directs the second half image 68 to the second position 78, as indicated by arrow 86.

Referring to FIG. 7, in an exemplary embodiment, the DLP 74 directs the first half image and the second half image with a pair of adjustable mirrors 88, 90. A first mirror 88 is used to direct the incoming first half image 66 toward the first position 76, and a second mirror 90 is used to direct the incoming second half image 68 toward the second position 78. While solid-state PLMs alone are capable of five degree FOVs, for augmented reality HUDs, an FOV of ten degrees is preferred. The first and second mirrors 88, 90 are each rotatable and adjustable, and capable of adjustment between plus or minus ten degrees.

The first half image 66 displayed at the first position 76 and the second half image 68 displayed at the second position 78 result in a re-creation of the holographic image, displayed on the inner surface of the windshield, and having a FOV that is twice the size of the FOV of the PLM.

In an exemplary embodiment, the DLP 74 is adapted to sequentially direct the first half image 66 to the first position 76 on the inner surface 58 of the windshield 60 of the vehicle 10 for less than 33 μs. After 33 μs, the projector 50 and the PLM 70 stop projecting the first half image 66 to the DLP and begin projecting the second half image 68 to the DLP. Now, the DLP is adapted to direct the second half image 68 to the second position 78 on the inner surface 58 of the windshield 60 of the vehicle 10 for less than 33 μs. This process is repeated, by alternating between displaying the first half image 66 at the first location 76 for less than 33 μs, and displaying the second half image 68 at the second location 78 for less than 33 μs.

If the time between the first half image 66 and the second half image 68 is greater than 30 Hz, flicker will not be perceptible by the occupant 62, an the first half image 66 and the second half image 68 will be fused into one image, as perceived by the occupant 62. 30 Hz translates to switching between images 66, 68 about every 33 µs.

In an exemplary embodiment, when the controller 34 calculates phase holograms for each of the first half image 66 and the second half image 68, the controller 34 is further adapted to calculate a red phase hologram 66R, a green phase hologram 66G and a blue phase hologram 66B for the first half image 66, and to calculate a red phase hologram 68R, a green phase hologram 68G and a blue phase hologram 68B for the second half image 68. The PLM 70 is further adapted to sequentially receive and encode the red phase hologram 66R, the green phase hologram 66G and the blue phase hologram 66B for the first half image 66, and the red phase hologram 68R, the green phase hologram 68G and the blue phase hologram 68B for the second half image 68.

Figure 8:
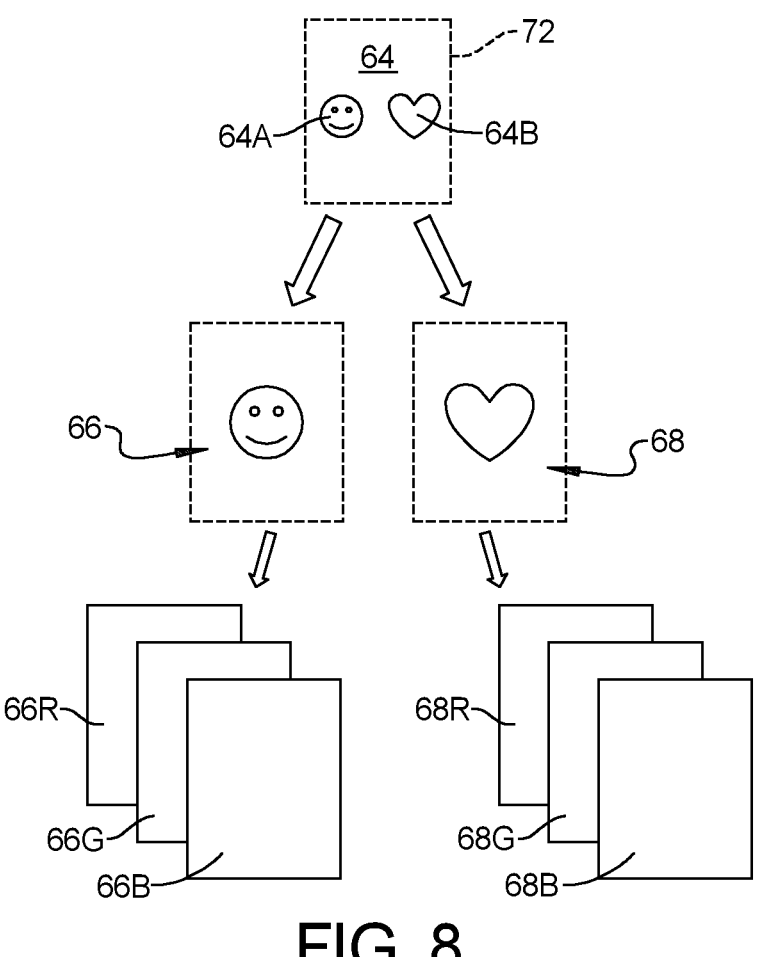
FIG. 8 is a schematic illustration showing the breakdown of a holographic image into first and second half images and then into red, green and blue phase holograms.

Referring to FIG. 8, the holographic image 64, as discussed above, is split into a first half image 66 and a second have image 68. The first half image 66 and the second half image 68 are further broken down into a red phase hologram 66R, a green phase hologram 66G and a blue phase hologram 66B for the first half image 66, and a red phase hologram 68R, a green phase hologram 68G and a blue phase hologram 68B for the second half image 68. The red phase hologram 66R, the a green phase hologram 66G and the blue phase hologram 66B are layered upon one another to create the first half image 66. The red phase hologram 68R, the green phase hologram 68G and the blue phase hologram 68B are layered upon one another to create the second half image 68.

The DLP 74 is further adapted to sequentially receive the red phase hologram 66R, the green phase hologram 66G and the blue phase hologram 66B for the first half image 66 and the red phase hologram 68R, the green phase hologram 68G and the blue phase hologram 68B for the second half image 68 from the PLM 70. The DLP 74 is adapted to sequentially direct the red phase hologram 66R, the green phase hologram 66G and the blue phase hologram 66B for the first half image 66 to the first position 76 on the inner surface 58 of the windshield 60 of the vehicle 10, and to sequentially direct the red phase hologram 68R, the green phase hologram 68G and the blue phase hologram 68B for the second half image 68 to the second position 78 on the inner surface 58 of the windshield 60 of the vehicle 10 and adjacent to the first position 76.

As discussed above, the display time for each of the first half image 66 and the second half image 68 must be less than 33 µs to ensure that the occupant perceives the first half image 66 and the second half image 68 simultaneously as one image. This is only possible by using an ultra-fast response time solid-state phase modulator, the PLM 70. In this way, because each of the first half image 66 and the second half image 68 are projected by the PLM 70, each one has the full FOV 72 of the PLM 70. Thus, when the first half image 66 and the second half image 68 appear adjacent to one another, the occupant 62 perceives a single image, much like the holographic image 64 shown in FIG. 4, however, the occupant 62 is actually looking at the first half image 66 and the second half image 68, each one have an FOV equal to the FOV 72 of the PLM, such that an FOV of the perceived image by the occupant is twice the FOV 72 of the PLM. This provides a larger viewing area for the occupant 62 and allows images being displayed to appear larger than they otherwise would be displayed.

In an exemplary embodiment, to ensure that the occupant 62 does not perceive any flicker as the PLM 70 and DLP 74 switch back and for the between the first half image 66 and the second half image 68, the DLP 74 is further adapted to sequentially direct the red phase hologram 66R for the first half image 66 to the first position 76 on the inner surface 58 of the windshield 60 of the vehicle 10 for less than 10 µs, then direct the green phase hologram 66G for the first half image 66 to the first position 76 on the inner surface 58 of the windshield 60 of the vehicle 10 for less than 10 µs, then direct the blue phase hologram 66B for the first half image 66 to the first position 76 on the inner surface 58 of the windshield 60 of the vehicle 10 for less than 10 µs. This keeps the switching frequency for the red, green and blue holograms 66R, 66G, 66B of the first half image 66 high enough to ensure that the occupant 62 does not perceive any flicker when the system 12 cycles through displaying the red, green and blue holograms 66R, 66G, 66B of the first half image 66, and keeps the overall time that the first half image 66 is displayed less than 33 µs.

After sequentially displaying the red, green and blue holograms 66R, 66G, 66B of the first half image 66, the DLP 74 is further adapted to direct the red phase hologram 68R for the second half image 68 to the second position 78 on the inner surface 58 of the windshield 60 of the vehicle 10 for less than 10 µs, then, direct the green phase hologram 68G for the second half image 68 to the second position 78 on the inner surface 58 of the windshield 60 of the vehicle 10 for less than 10 µs, and then, direct the blue phase hologram 68B for the second half image 68 to the second position 78 on the inner surface 58 of the windshield 60 of the vehicle 10 for less than 10 µs. This keeps the switching frequency for the red, green and blue holograms 68R, 68G, 68B of the second half image 68 high enough to ensure that the occupant 62 does not perceive any flicker when the system 12 cycles through displaying the red, green and blue holograms 68R, 68G, 68B of the second half image 68, and keeps the overall time that the second half image 68 is displayed less than 33 µs.

Switching back and forth between displaying the first half image 66 and the second half image 68 means that each of the first half image 66 and the second half image 68 are only displayed for half of the time. This results in decreased brightness of the overall holographic image 64 perceived by the occupant 62. In an exemplary embodiment, the power level of each of the red, green and blue lasers is increased to compensate for such luminance decrease due to sequential switching between the first half image 66 and the second half image 68.

The red laser 52, green laser 54 and blue laser 56 have different and varying wavelengths, which can cause color and edge alignment issues between the first half image 66 and the second half image 68, as well as between the red hologram 66R, green hologram and blue hologram of the first half image 66 and the red hologram, green hologram and blue hologram of the second half image 68. In an exemplary embodiment, DLP 74 is adapted to use a compensation algorithm to precisely match an FOV of the red phase hologram, the green phase hologram and the blue phase hologram for each of the first half image 66 and the second half image 68, due to varying wavelengths of the red, green and blue lasers 52, 54, 56.

Figure 9:
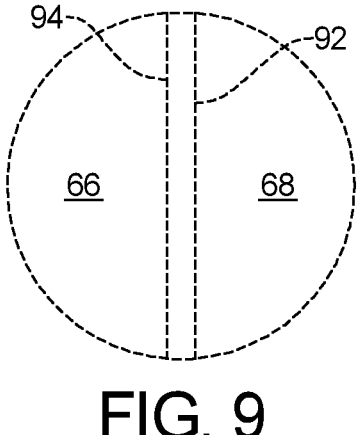
FIG. 9 is an enlarged portion of FIG. 5, as indicated in FIG. 5.

In another exemplary embodiment, the DLP 74 includes a photo sensor with active feedback that is adapted to maintain color alignment, precise overlapping of the red, green and blue holograms 66R, 68R, 66G, 68G, 66B, 68B of each of the first half image 66 and the second half image 68, and image edge alignment between the first half image 66 and the second half image 68. The DLP 74 is further adapted to blend the adjacent edge 92 of the first half image 66 and the adjacent edge 94 of the second half image 68 to allow overlapping of the adjacent edges 92, 94 of the first half image 66 and the second half image 68, as shown in FIG. 9.

Figure 10:
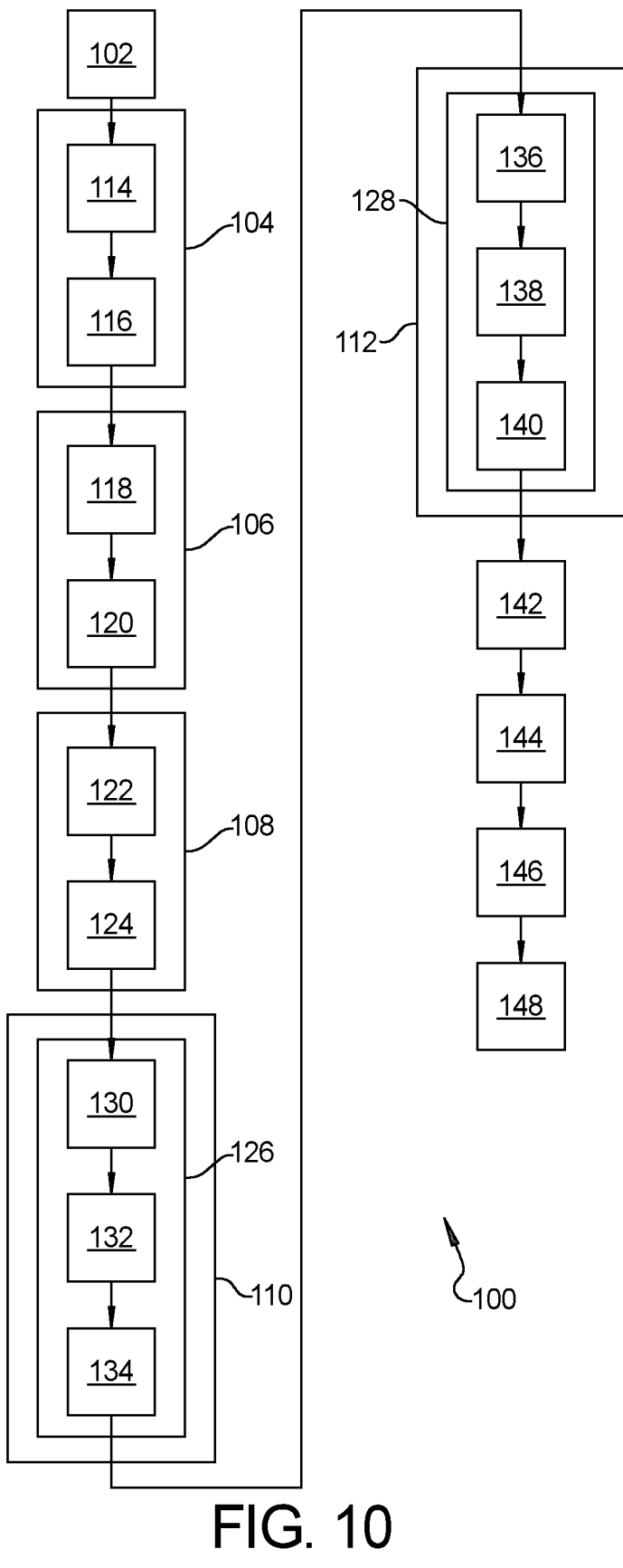
FIG. 10 is a flow chart illustrating a method according to an exemplary embodiment of the present disclosure.

Referring to FIG. 10, a flowchart illustrating a method 100 of enlarging the field of view of a head up display 12 for a vehicle 10 includes, beginning at block 102, splitting, with a controller 34 a holographic image 64 into a first half image 66 and a second half image 68, moving to block 104, calculating, with the controller 34, phase holograms for each of the first half image 66 and the second half image 68, moving to block 106, sequentially and alternately, with a phase light modulator (PLM) 70 having a defined field of view (FOV) 72, receiving, from a holographic projector 50 adapted to project a holographic image 64, the first half image 66 and the second half image 68, and, encoding the first half image 66 and the second half image 68.

Moving to block 108, the method includes sequentially and alternately, with a digital light processor (DLP) 74, receiving the first half image 66 and the second half image 68 from the PLM 70, moving to block 10, sequentially, with the DLP 74, directing the first half image 66 to a first position 76 on an inner surface 58 of a windshield 60 of the vehicle 10, and, moving to block 112, directing the second half image 68 to a second position 78 on the inner surface 58 of the windshield 60 of the vehicle 10 and adjacent to the first position 76, wherein, the first half image 66 displayed at the first position 76 and the second half image 68 displayed at the second position 78 result in a re-creation of the holographic image 64, displayed on the inner surface 58 of the windshield 60, and having a FOV 79 that is twice the size of the FOV 72 of the PLM 70.

In an exemplary embodiment, the sequentially, with the DLP 74, directing the first half image 66 to a first position 76 on an inner surface 58 of a windshield 60 of the vehicle 10, at block 110 and directing the second half image 68 to the second position 78 on the inner surface 58 of the windshield 60 of the vehicle 10 and adjacent to the first position 76, at block 112, further includes directing the first half image 66 to the first position 76 on the inner surface 58 of the windshield 60 of the vehicle 10 for less than 33 µs, and directing the second half image 68 to the second position 78 on the inner surface 58 of the windshield 60 of the vehicle 10 for less than 33 µs.

In another exemplary embodiment, the holographic projector 50 includes a red laser 52, a green laser 54 and a blue laser 56, and the calculating, with the controller 34, phase holograms for each of the first half image 66 and the second half image 68, at block 104, further includes, moving to block 114, calculating a red phase hologram 66R, a green phase hologram 66G and a blue phase hologram 66B for the first half image 66, and, moving to block 116, calculating a red phase hologram 68R, a green phase hologram 68G and a blue phase hologram 68B for the second half image 68.

In another exemplary embodiment, the sequentially and alternately, with the phase light modulator (PLM) 70 having a defined field of view (FOV) 72, receiving, from the holographic projector 50 adapted to project the holographic image 64, the first half image 66 and the second half image 68, and, encoding the first half image 66 and the second half image 68, at block 106, further includes, moving to block 118, sequentially receiving and encoding, with the PLM 70, the red phase hologram 66R, the green phase hologram 66G and the blue phase hologram 66B for the first half image 66, and moving to block 120, receiving and encoding, with the PLM 70, the red phase hologram 68R, the green phase hologram 68G and the blue phase hologram 68B for the second half image 68.

In another exemplary embodiment, the sequentially and alternately, with the digital light processor (DLP) 74, receiving the first half image 66 and second half image 68 from the PLM 70, at block 108, further includes, moving to block 122, sequentially receiving, with the DLP 74, the red phase hologram 66R, the green phase hologram 66G and the blue phase hologram 66B for the first half image 66 and, moving to block 124, sequentially receiving, with the DLP 74, the red phase hologram 68R, the green phase hologram 68G and the blue phase hologram 68B for the second half image 68 from the PLM 70.

Further, the sequentially, with the DLP 74, directing the first half image 66 to the first position 76 on the inner surface 58 of the windshield 60 of the vehicle 10, at block 110, further includes, moving to block 126, sequentially directing, with the DLP, the red phase hologram 66R, the green phase hologram 66G and the blue phase hologram 66B for the first half image 66 to the first position 76 on the inner surface 58 of the windshield 60 of the vehicle 10.

Further still, the sequentially, with the DLP 74, directing the second half image 68 to the second position 78 on the inner surface 58 of the windshield 60 of the vehicle 10, at block 112, further includes, moving to block 128, sequentially directing, with the DLP 74, the red phase hologram 68R, the green phase hologram 68G and the blue phase hologram 68B for the second half image 68 to the second position 78 on the inner surface 58 of the windshield 60 of the vehicle 10 and adjacent to the first position 76.

In another exemplary embodiment, the sequentially directing, with the DLP 74, the red phase hologram 66R, the green phase hologram 66G and the blue phase hologram 66B for the first half image 68 to the first position 76 on the inner surface 58 of the windshield 60 of the vehicle 10, at block 126, further includes, moving to block 130, directing the red phase hologram 66R for the first half image 66 to the first position 76 on the inner surface 58 of the windshield 60 of the vehicle 10 for less than 10 µs, moving to block 132, directing the green phase hologram 66G for the first half image 66 to the first position 76 on the inner surface 58 of the windshield 60 of the vehicle 10 for less than 10 µs, and, moving to block 134, directing the blue phase hologram 66B for the first half image 66 to the first position 76 on the inner surface 58 of the windshield 60 of the vehicle 10 for less than 10 µs. Further, the sequentially directing, with the DLP 74, the red phase hologram 68R, the green phase hologram 68G and the blue phase hologram 68B for the second half image 68 to the second position 78 on the inner surface 58 of the windshield 60 of the vehicle 10, at block 128, further includes, moving to block 136, directing the red phase hologram 68R for the second half image 68 to the second position 78 on the inner surface 58 of the windshield 60 of the vehicle 10 for less than 10 µs, moving to block 138, directing the green phase hologram 68G for the second half image 68 to the second position 78 on the inner surface 58 of the windshield 60 of the vehicle 10 for less than 10 µs, and, moving to block 140, directing the blue phase hologram 68B for the second half image 68 to the second position 78 on the inner surface 58 of the windshield 60 of the vehicle 10 for less than 10 µs.

In an exemplary embodiment the method 100 further includes, moving to block 142, increasing the power level of each of the red, green and blue lasers to compensate for luminance decrease due to sequential switching between the first half image 66 and the second half image 68.

In another exemplary embodiment the method 100 further includes, moving to block 144, using, with the DLP 74, a compensation algorithm to precisely match an FOV of the red phase hologram, the green phase hologram and the blue phase hologram for each of the first half image 66 and the second half image 68, due to varying wavelength of the red, green and blue lasers 52, 54, 56.

In another exemplary embodiment, the DLP 74 includes a photo sensor 96 with active feedback, the method 100 further including, moving to block 146, maintaining, with the DLP 74, using feedback from the photo sensor 92, color alignment and image edge alignment between the first half image 66 and the second half image 68, and, moving to block 148, blending the adjacent edge 92 of the first half image 66 and the adjacent edge 94 of the second half image 68, with the DLP 74, to allow overlapping of adjacent edges 92, 94 of the first half image 66 and the second half image 68.

A system and method of the present disclosure offers the advantage of expanding the field of view of the HUD system while using a solid-state phase light modulator in combination with a digital light processor.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A head up display for a vehicle, comprising:
   a holographic projector adapted to project a holographic image;
   a controller adapted to split a holographic image into a first half image and a second half image and calculate phase holograms for each of the first half image and the second half image;
   a phase light modulator (PLM) having a defined field of view (FOV) and adapted to sequentially and alternately receive and encode the first half image and the second half image; and
   a digital light processor (DLP) adapted to:
       sequentially and alternately receive the first half image and second half image from the PLM; and
       sequentially direct the first half image to a first position on an inner surface of a windshield of the vehicle, and direct the second half image to a second position on the inner surface of the windshield of the vehicle and adjacent to the first position; and
   wherein, the first half image displayed at the first position and the second half image displayed at the second position result in a re-creation of the holographic image, displayed on the inner surface of the windshield, and having a FOV that is twice the size of the FOV of the PLM.

2. The head up display system of claim 1, wherein the DLP is adapted to sequentially direct the first half image to the first position on the inner surface of the windshield of the vehicle for less than 33 μs, and direct the second half image to the second position on the inner surface of the windshield of the vehicle for less than 33 μs.

3. The head up display of claim 1, wherein the holographic projector includes a red laser, a green laser and a blue laser, and when the controller calculates phase holograms for each of the first half image and the second half image, the controller is further adapted to calculate a red phase hologram, a green phase hologram and a blue phase hologram for the first half image, and to calculate a red phase hologram, a green phase hologram and a blue phase hologram for the second half image.

4. The head up display of claim 3, wherein the PLM is further adapted to sequentially receive and encode the red phase hologram, the green phase hologram and the blue phase hologram for the first half image, and the red phase hologram, the green phase hologram and the blue phase hologram for the second half image.

5. The head up display of claim 4, wherein the DLP is further adapted to:
   sequentially receive the red phase hologram, the green phase hologram and the blue phase hologram for the first half image and the red phase hologram, the green phase hologram and the blue phase hologram for the second half image from the PLM;
   sequentially direct the red phase hologram, the green phase hologram and the blue phase hologram for the first half image to the first position on the inner surface of the windshield of the vehicle; and
   sequentially direct the red phase hologram, the green phase hologram and the blue phase hologram for the second half image to the second position on the inner surface of the windshield of the vehicle and adjacent to the first position.

6. The head up display of claim 5, wherein the DLP is further adapted to sequentially:
   direct the red phase hologram for the first half image to the first position on the inner surface of the windshield of the vehicle for less than 10 μs;
   direct the green phase hologram for the first half image to the first position on the inner surface of the windshield of the vehicle for less than 10 μs;
   direct the blue phase hologram for the first half image to the first position on the inner surface of the windshield of the vehicle for less than 10 μs;
   direct the red phase hologram for the second half image to the second position on the inner surface of the windshield of the vehicle for less than 10 μs;
   direct the green phase hologram for the second half image to the second position on the inner surface of the windshield of the vehicle for less than 10 μs; and
   direct the blue phase hologram for the second half image to the second position on the inner surface of the windshield of the vehicle for less than 10 μs.

7. The head up display of claim 6, wherein a power level of each of the red, green and blue lasers is increased to compensate for luminance decrease due to sequential switching between the first half image and the second half image.

8. The head up display of claim 6, wherein the DLP is adapted to use a compensation algorithm to precisely match an FOV of the red phase hologram, the green phase hologram and the blue phase hologram for each of the first half image and the second half image, due to varying wavelength of the red, green and blue lasers.

9. The head up display of claim 6, wherein the DLP includes a photo sensor with active feedback and is adapted to maintain color alignment and image edge alignment between the first half image and the second half image.

10. The head up display of claim 6, wherein the DLP is adapted to blend adjacent edges of the first half image and the second half image to allow overlapping of the adjacent edges of the first half image and the second half image.

11. A method of enlarging the field of view of a head up display for a vehicle, comprising:
   splitting, with a controller a holographic image into a first half image and a second half image;

calculating, with the controller, phase holograms for each of the first half image and the second half image;

sequentially and alternately, with a phase light modulator (PLM) having a defined field of view (FOV), receiving, from a holographic projector adapted to project a holographic image, the first half image and the second half image, and, encoding the first half image and the second half image;

sequentially and alternately, with a digital light processor (DLP), receiving the first half image and second half image from the PLM; and sequentially, with the DLP, directing the first half image to a first position on an inner surface of a windshield of the vehicle, and directing the second half image to a second position on the inner surface of the windshield of the vehicle and adjacent to the first position;

wherein, the first half image displayed at the first position and the second half image displayed at the second position result in a re-creation of the holographic image, displayed on the inner surface of the windshield, and having a FOV that is twice the size of the FOV of the PLM.

12. The method of claim 11, wherein the sequentially, with the DLP, directing the first half image to a first position on an inner surface of a windshield of the vehicle, and directing the second half image to a second position on the inner surface of the windshield of the vehicle and adjacent to the first position further includes directing the first half image to the first position on the inner surface of the windshield of the vehicle for less than 33 μs, and directing the second half image to a second position on the inner surface of the windshield of the vehicle for less than 33 μs.

13. The method of claim 11, wherein the holographic projector includes a red laser, a green laser and a blue laser, and the calculating, with the controller, phase holograms for each of the first half image and the second half image further includes calculating a red phase hologram, a green phase hologram and a blue phase hologram for the first half image, and calculating a red phase hologram, a green phase hologram and a blue phase hologram for the second half image.

14. The method of claim 13, wherein the sequentially and alternately, with a phase light modulator (PLM) having a defined field of view (FOV), receiving, from the holographic projector adapted to project the holographic image, the first half image and the second half image, and, encoding the first half image and the second half image further includes sequentially receiving and encoding, with the PLM, the red phase hologram, the green phase hologram and the blue phase hologram for the first half image, and receiving and encoding, with the PLM, the red phase hologram, the green phase hologram and the blue phase hologram for the second half image.

15. The method of claim 14, wherein the sequentially and alternately, with a digital light processor (DLP), receiving the first half image and second half image from the PLM further includes sequentially receiving, with the DLP, the red phase hologram, the green phase hologram and the blue phase hologram for the first half image and the red phase hologram, the green phase hologram and the blue phase hologram for the second half image from the PLM;

the sequentially, with the DLP, directing the first half image to the first position on an inner surface of a windshield of the vehicle further includes sequentially directing, with the DLP, the red phase hologram, the green phase hologram and the blue phase hologram for the first half image to the first position on the inner surface of the windshield of the vehicle; and the sequentially, with the DLP, directing the second half image to the second position on the inner surface of the windshield of the vehicle further includes sequentially directing, with the DLP, the red phase hologram, the green phase hologram and the blue phase hologram for the second half image to the second position on the inner surface of the windshield of the vehicle and adjacent to the first position.

16. The method of claim 15, wherein:

the sequentially directing, with the DLP, the red phase hologram, the green phase hologram and the blue phase hologram for the first half image to the first position on the inner surface of the windshield of the vehicle further includes:

directing the red phase hologram for the first half image to the first position on the inner surface of the windshield of the vehicle for less than 10 μs;

directing the green phase hologram for the first half image to the first position on the inner surface of the windshield of the vehicle for less than 10 μs; and directing the blue phase hologram for the first half image to the first position on the inner surface of the windshield of the vehicle for less than 10 μs; and the sequentially directing, with the DLP, the red phase hologram, the green phase hologram and the blue phase hologram for the second half image to the second position on the inner surface of the windshield of the vehicle further includes:

directing the red phase hologram for the second half image to the second position on the inner surface of the windshield of the vehicle for less than 10 μs;

directing the green phase hologram for the second half image to the second position on the inner surface of the windshield of the vehicle for less than 10 μs; and directing the blue phase hologram for the second half image to the second position on the inner surface of the windshield of the vehicle for less than 10 μs.

17. The method of claim 16, further including increasing a power level of each of the red, green and blue lasers to compensate for luminance decrease due to sequential switching between the first half image and the second half image.

18. The method of claim 16, further including using, with the DLP, a compensation algorithm to precisely match an FOV of the red phase hologram, the green phase hologram and the blue phase hologram for each of the first half image and the second half image, due to varying wavelength of the red, green and blue lasers.

19. The method of claim 16, wherein the DLP includes a photo sensor with active feedback, the method further including:

maintaining, with the DLP, using feedback from the photo sensor, color alignment and image edge alignment between the first half image and the second half image; and blending adjacent edges of the first half image and the second half image, with the DLP, to allow overlapping of adjacent edges of the first half image and the second half image.

20. A head up display for a vehicle, comprising:

a holographic projector including a red laser, a green laser and a blue laser, and adapted to project a holographic image;

a controller adapted to split a holographic image into a first half image and a second half image and to calculate a red phase hologram, a green phase hologram and a blue phase hologram for the first half image, and to calculate a red phase hologram, a green phase hologram and a blue phase hologram for the second half image;

a phase light modulator (PLM) having a defined field of view (FOV) and adapted to sequentially and alternately receive and encode the red phase hologram, the green phase hologram and the blue phase hologram for the first half image, and the red phase hologram, the green phase hologram and the blue phase hologram for the second half image; and a digital light processor (DLP) adapted to:

sequentially receive the red phase hologram, the green phase hologram and the blue phase hologram for the first half image and the red phase hologram, the green phase hologram and the blue phase hologram for the second half image from the PLM; and sequentially:

direct the red phase hologram for the first half image to the first position on the inner surface of the windshield of the vehicle for less than 10 µs;

direct the green phase hologram for the first half image to the first position on the inner surface of the windshield of the vehicle for less than 10 µs;

direct the blue phase hologram for the first half image to the first position on the inner surface of the windshield of the vehicle for less than 10 µs;

direct the red phase hologram for the second half image to the second position on the inner surface of the windshield of the vehicle for less than 10 µs;

direct the green phase hologram for the second half image to the second position on the inner surface of the windshield of the vehicle for less than 10 µs; and direct the blue phase hologram for the second half image to the second position on the inner surface of the windshield of the vehicle for less than 10 µs; and use a compensation algorithm to precisely match an FOV of the red phase hologram, the green phase hologram and the blue phase hologram for each of the first half image and the second half image, due to varying wavelength of the red, green and blue lasers;

wherein, the first half image displayed at the first position and the second half image displayed at the second position result in a re-creation of the holographic image, displayed on the inner surface of the windshield, and having a FOV that is twice the size of the FOV of the PLM, and the DLP includes a photo sensor with active feedback and is adapted to maintain color alignment and image edge alignment between the first half image and the second half image, and to blend adjacent edges of the first half image and the second half image to allow overlapping of the adjacent edges of the first half image and the second half image.

* * * * *